Oct. 21, 1958   C. P. GEEN   2,857,216
SELF-BALANCING SPINDLE
Filed July 11, 1955   4 Sheets-Sheet 1
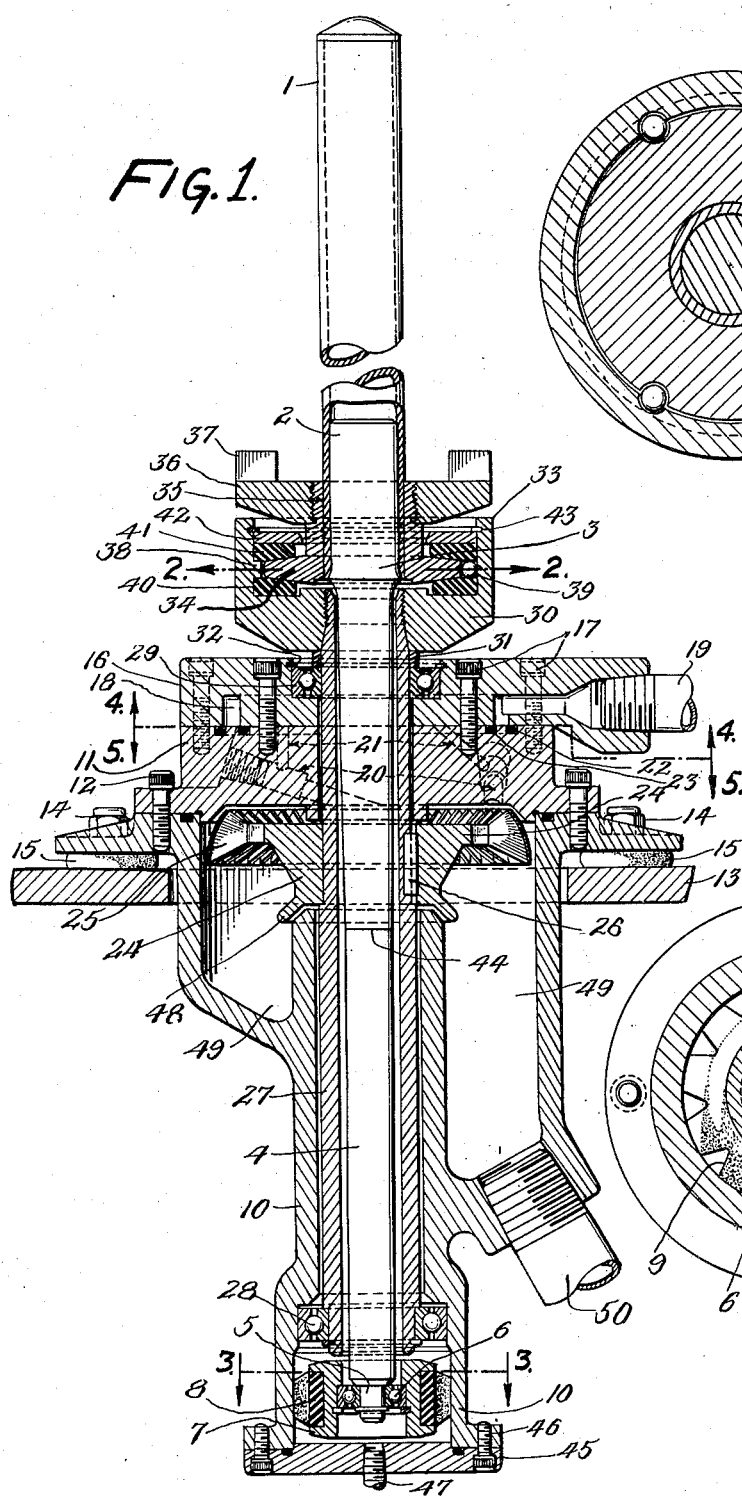

Oct. 21, 1958  C. P. GEEN  2,857,216
SELF-BALANCING SPINDLE
Filed July 11, 1955  4 Sheets-Sheet 2
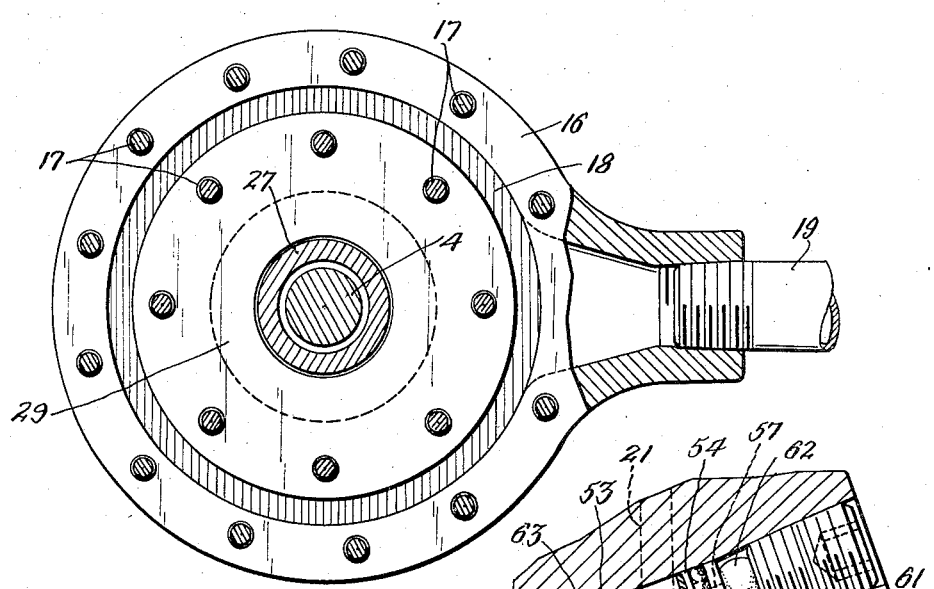
FIG. 4.
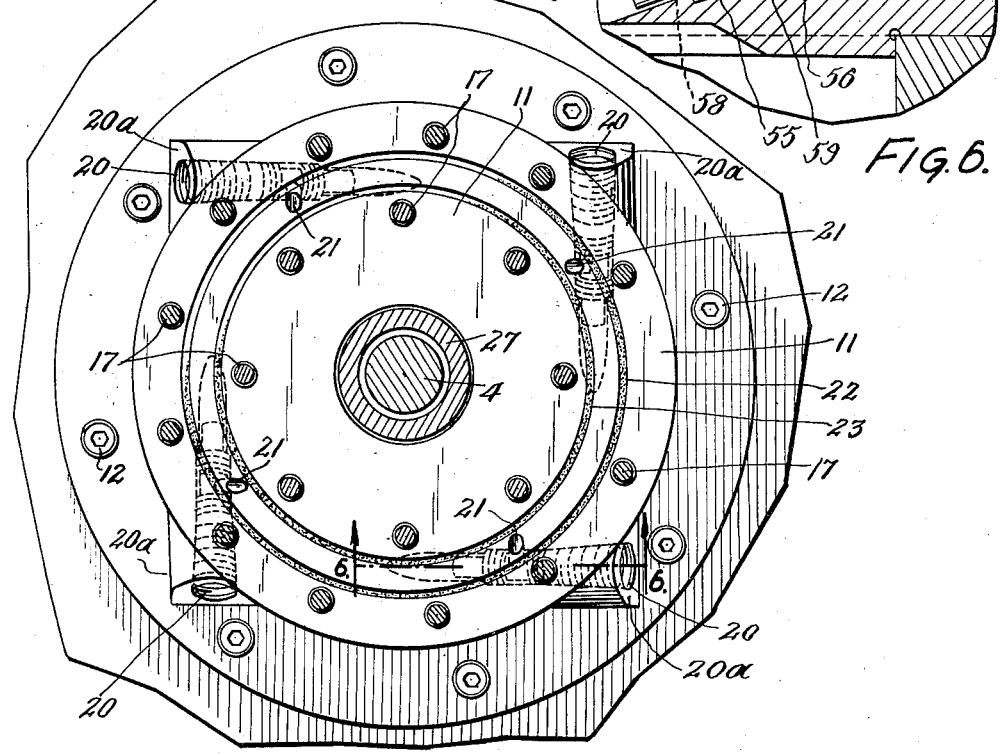
FIG. 5.
FIG. 6.

Oct. 21, 1958
C. P. GEEN
2,857,216
SELF-BALANCING SPINDLE
Filed July 11, 1955
4 Sheets-Sheet 3
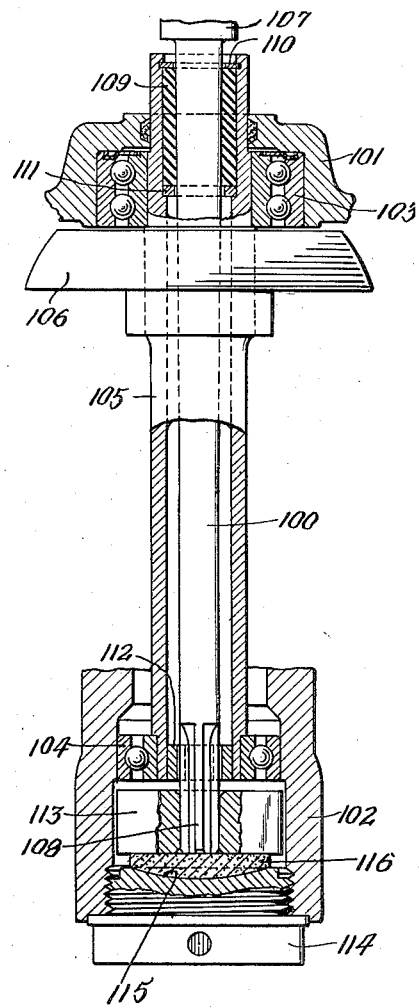
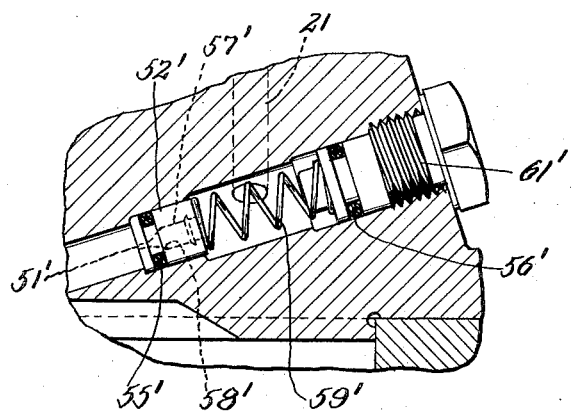

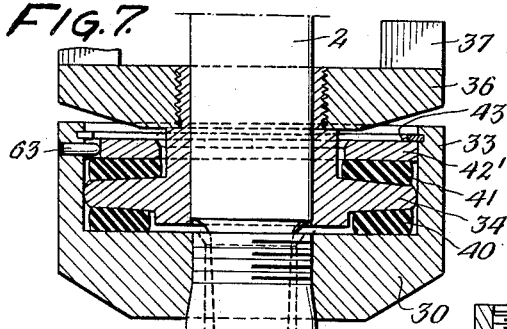

United States Patent Office 2,857,216
Patented Oct. 21, 1958

2,857,216

SELF-BALANCING SPINDLE

Cory P. Geen, Philadelphia, Pa., assignor to Industrial Devices, Inc., Philadelphia, Pa., a corporation of Pennsylvania Application July 11, 1955, Serial No. 520,993

5 Claims. (Cl. 308—152)

This application is a continuation-in-part of my copending application, Serial No. 399,002, filed December 18, 1953, which was in turn a continuation-in-part of my earlier filed application, Serial No. 184,284, filed September 11, 1950, now Patent No. 2,663,541, issued December 22, 1953.

This invention relates as indicated to self-balancing spindles and is particularly adapted to a wide variety of industrial equipment, wherein a driven spindle is adapted to receive an object or device to be driven especially at high speeds and where it is essential that the vibration of the equipment be reduced to a very minimum.

There are many types of industrial equipment to which this invention is applicable, one such being in the textile field where it is desired to drive yarn-receiving bobbins at high speed for the purpose of taking up the yarn on the bobbin during many of the operations customarily performed in the textile industry.

Other uses include devices such as grinding wheels, buffing wheels, as well as any other object or driven device which is desirably driven at a high speed in a vibrationless manner on a spindle for example on which the device may be removably supported so that it is impractical to dynamically balance the entire equipment each time a new device is installed.

It is a principal object of my invention therefore to provide a self-balancing spindle of the type referred to which is extremely effective and can be constructed and maintained at relatively low cost.

It is a further object of my invention to provide a construction of the character described which is adaptable to easy adjustment to accommodate loads or driven devices of various types and different weights so that the self-balancing spindle can be made to accommodate a wide range of loads.

Other objects of my invention will appear as the description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a vertical section through one embodiment of my invention;

Fig. 2 is a transverse sectional view of the apparatus illustrated in Fig. 1 taken on a plane substantially indicated by the line 2—2;

Fig. 3 is another transverse sectional view of the apparatus illustrated in Fig. 1 taken on a plane indicated by the line 3—3;

Fig. 4 is another transverse sectional view of the apparatus illustrated in Fig. 1 taken on a plane indicated by the line 4—4 and the arrows indicating the direction in which the illustration of Fig. 4 appears;

Fig. 5 is still another transverse sectional view taken on the same plane as Fig. 4, but viewing the apparatus in the opposite direction;

Fig. 6 is a fragmentary, sectional view of a portion of the apparatus illustrated for example in Fig. 5, taken on a plane indicated by the line 6—6;

Fig. 6a is an illustration similar to Fig. 6, but showing an alternative form of construction in respect of the form shown in Fig. 6;

Fig. 7 is a fragmentary vertical sectional view similar to a portion of Fig. 1, but showing an alternative form of construction in respect of the hub and the equipment contained therein;

Fig. 8 is a fragmentary vertical sectional view similar to a portion of Fig. 1 showing a modified form of construction of the lower portion of the apparatus illustrated in Fig. 1;

Fig. 9 is a vertical sectional view similar to Fig. 1 but showing an alternative form of construction here differing from Fig. 1 largely in that the apparatus of Fig. 9 is belt-driven instead of hydraulically driven as in Fig. 1;

Fig. 10 is a vertical sectional view similar to Fig. 1 but showing the adaptation of the invention to a device driven electrically; and Fig. 11 is a fragmentary view, partially in section, similar to Fig. 1 showing an alternate form of construction.

As previously indicated, the apparatus comprising my invention is adapted to a wide variety of uses, in that it may be used for the purpose of driving many different types of devices which, for example, may be conveniently mounted on a spindle and driven at high speeds by such spindle.

The embodiment which I have chosen for purposes of illustration in Fig. 1 for example, can be used conveniently for the purpose of mounting and driving spindles used in the textile industry, and in the following description of this invention, this embodiment will be referred to particularly, although it will be recognized that the same apparatus or obvious modifications thereof may be adapted to a wide variety of uses.

Referring now, therefore, more specifically to Fig. 1, it will be noted that the apparatus here illustrated consists of a spindle 1 which is adapted to receive, support and drive the object to be driven which is an upward tubular extension of a spindle shank 2 which is here illustrated as the upper end of a solid bar which is machined in the area indicated at 3 so as to facilitate upsetting the lower end of the tubular spindle 1 on the spindle shank 2 to provide a permanent connection between the parts. The lower extension 4 of the spindle shank terminates in a reduced end 5 on which is mounted a dampener bearing 6 carried by a dampener spool 7 which, on its periphery, supports a dampener element 8. The dampener element 8 as most clearly illustrated in Fig. 3 is centrally substantially cylindrical, that is, is supported on the dampener spool 7, but on its periphery is provided with a plurality of notches 9, the number and size of which has an important bearing, in the manner hereinafter more particularly explained, on the sensitivity of the dampening element.

It will be noted that the outer periphery of the dampener element 8 bears against the inner periphery of a housing stem 10 which is substantially cylindrical and at its upper end supports a nozzle plate 11, the latter being secured to the housing stem by means of a plurality of circumferentially spaced bolts, generally indicated at 12.

At this point it may be noted that when the device is used for the purpose of supporting and driving textile spindles, it will most generally be mounted on what is commonly referred to as a rail 13 by means of a plurality of bolts 14 and intermediate flexible cushions 15 which may be of rubber or other flexible material.

Mounted on top of the nozzle plate 11 is a nozzle plate cover 16 which is secured to the nozzle plate by means of a plurality of bolts 17 and contains a pressure cavity 18 into which the hydraulic or similar fluid, for the purpose of driving the turbine presently described, is introduced by means of a pressure line connection 19. It will be noted that, as hereinafter more fully explained, the nozzle plate 11 is provided with a plurality of bosses 20a in which are formed main bores 20 which have communication with the pressure chamber 18 through branch bores 21. The branch bores 21 as most clearly illustrated in Fig. 5, which will be referred to presently, open out of the nozzle plate 11 in an annular area directly beneath the pressure chamber 18, the area being bounded by annular gaskets 22 and 23 which are, for example, conventional O-rings.

The means provided for driving the spindle in the embodiment of the apparatus illustrated in Fig. 1 is a hydraulic motor of the type disclosed and claimed in my aforesaid issued Patent No. 2,663,541.

It might be well to point out, however, that when utilizing a motor of this type for the purpose of driving a spindle as illustrated in Fig. 1, the rotor hub 24, which carries the vanes 25 which derive energy from the streams projected from the nozzles mounted in the ends of passages 20, is secured by means of a key 26 to a rotor shaft 27 which is journalled in the housing stem by a lower bearing 28 and an upper bearing 29. The manner in which the nozzle is mounted in the nozzle plate will be described in greater detail in connection with the description of Figs. 5, 6 and 6a.

Mounted on the upper end of the rotor shaft 27 is a cup 30. In the form illustrated in Fig. 1, the cup is threaded onto the end of the rotor shaft 27 and by means of a spacer 31 is positioned relative to the upper bearing 29. It will be noted that the upper bearing 29 is held in a recess provided therefor in the upper face of the nozzle plate cover 16 by means of a snap ring 32.

The cup 30 comprises a main body and a substantially cylindrical cup flange 33, the inner periphery of which is carefully machined so as to be concentric with the axis of the cup, or more accurately, concentric with the axis of the rotor shaft 27 on which it is mounted.

Driving connection between the rotor shaft and the spindle 1 is, in the embodiment illustrated in Fig. 1, provided through a spindle drive flange 34. The spindle drive flange 34 and the spindle shank 4 and the tubular upward extension of the spindle 1 are all preferably shrunk-fitted and then brazed in order to provide a unitary assembly which may not become misaligned. The spindle drive flange 34 is provided with an axial cylindrical extension 35 which is threaded on its periphery and threadably receives a bobbin drive 36. In the form illustrated in Fig. 1, the bobbin drive 36 is provided with driving dogs 37. At this point it should be recognized that the particular bobbin drive utilized with the spindle, forms no part whatsoever of the present invention, the illustrated form being only one of the many used in the textile industry at the present time.

On the inner periphery of the cup flange 33 there is an annular rib 38. It is the inner peripheral surface of the rib 38 which, in the construction illustrated in Fig. 1 must be very carefully machined so that it is truly cylindrical and truly concentric with the axis of the cup. At three spaced points, as most clearly illustrated in Fig. 2, the flange 34 and the rib 38 are provided with complementary relieved areas or notches adapted to receive driving balls 39 by which positive driving communication is established between the flange 34 and the cup.

At this point it should be noted particularly that it is essential for best operation that the outer peripheral surface of the spindle drive flange 34 be machined to conform to a segment of a sphere and that its radius be with sliding fit tolerance, the same as the radius of the inner periphery of the rib 38. Mounted in the cup 30 on opposite sides of the spindle drive flange 34 are annular rubber washers 40 and 41. Mounted on top of the upper washer 41 is an annular metallic compression washer 42 which is held in place by means of a snap ring 43.

The spindle shank 4 from the point of attachment thereto of the tubular upward extension of the spindle to the line at 44 may be tapered and continue downwardly from the line 44 in truly cylindrical form. This taper is not essential, but was included in the construction illustrated in Fig. 1 merely for the purpose of providing slightly greater rigidity in the spindle shank in the upper portion thereof where connection is made to the tubular extension and where driving forces are transmitted from the driving means to the spindle. It should be noted also that the outer diameter of the spindle shank 4 in the lower end of the rotor shaft 27 should be sufficiently less than the inner diameter of the rotor shaft 27 so that the spindle shank may move laterally or radially as permitted by the dampener elements 8 in the manner presently to be described.

The lower end of the housing stem 10 is closed by means of a bottom cover 45 held on by means of a plurality of bolts 46 and provided with a drain 47 for the purpose of carrying out from the lower end of the housing stem any excess hydraulic fluid which may find its way into the lower end since it is desirable that the bearings 28 and 6 be not submerged during operation. In this connection, it should be noted that such drain is usually not necessary when the rotor cup 24 is provided with an annular flange 48 which in usual nomenclature is referred to as an oil slinger, since as the hub 24 rotates, any hydraulic fluid flowing downwardly over the surface of the hub will be drawn outwardly under centrifugal force into the cavity 49 from whence it is discharged through the exhaust 50. In those cases, in order to provide adequate lubrication for the bottom bearings, suitable fittings for the introduction of extraneous lubricant may be provided, although they are not shown in the drawing, or life-time sealed lubrication bearings which are now available may be employed.

At this point it should be noted that the spindle proper, which is in effect a combination of the spindle shank 4 and the upwardly extending tubular extension thereof, is supported and functions on the basic principles of a first-class lever, in that the spindle drive flange 34 and the cup or more accurately the rib 38 therein insure unvarying concentricity between the spindle and the driving cup in the area of force transfer from the driving member to the driven member, while at the same time permitting relative angular displacement of the axes of such elements.

Stated in another way, the spindle drive flange 34 and the inner periphery of the cup 30, or more accurately its rib 38, provide a fixed pivot for the first class lever, i. e. the spindle. The load on the spindle is the amount of eccentricity of the device supported on the spindle, that is, the amount of radial load placed on the upper end of the spindle due to the eccentricity of the load during rotation. The force of the first class lever is supplied by means of the dampener element 8. I know of no other self-balancing spindle which has thus utilized the principle of a first-class lever for the purpose of effecting balancing of the eccentric load on the spindle.

It is essential that there be no permissible relative radial movement between the spindle and the driving cup at the pivotal connection therebetween, i. e. the connection about which the spindle pivots with respect to the cup and the connection through which the driving force is transmitted from the cup to the spindle. While a certain amount of opposed resilient restraint on the spindle at this point of connection might provide a structure which would operate for a limited period of time nevertheless extended experiments which I have conducted show that no such permissible resiliently opposed, relative movement in a radial direction between the cup and the spindle should be permitted if the device is to be capable of operation in an efficient manner over an extended period of time.

During the time of acceleration from a standstill with an unbalanced mass applied to the upper portion of the spindle, it is recognized that there will be some vibration especially while passing through the so-called critical period. It is at this time that the dampener element is of greatest effectiveness and it keeps the entire system under control. After passing through the critical period, the spindle and the mass applied to it have assumed a position of displacement so that the center of mass of the rotated mass lies on its axis of rotation. From this point on to the maximum speed of the device, the spindle is said to be gyroscopically balanced and the dampener is practically inoperative.

While, as just stated, when the spindle is driven at a speed above the critical speed, it is gyroscopically balanced, nevertheless it must be kept in mind that even at that stage the dampener element is not wholly without function. Since because of its resiliency it permits angular displacement of the spindle shank with respect to the cup 30 so that the spindle can assume a position, such that the axis of rotation of the rotated mass passes through the center of gravity of the rotated mass so that the dampener element functions to dampen out vibrations up to and through the critical speed and then in effect subsides or steps aside and permits the true gyroscopic effect to take place and permits the load carried by the spindle to be gyroscopically balanced. This would not be possible if the dampener element were inflexible, since under those circumstances, it would never be possible for the spindle shank to assume the position where its axis of rotation passes through the center of gravity of the mass.

With regard to the illustration given in Fig. 2 wherein the three driving balls 39 are shown, this is truly not a preferred construction since for best results when utilizing a driving connection of this type, at least five or preferably more such balls should be employed in evenly spaced relation about the axis.

By having reference to rubber washers 40 and 41, it will be noted that they are wedge-shaped in cross section and that the cross sectional area of the flange 34 is correspondingly tapered. This is desirable for best results since by having the parts shaped in the manner illustrated, the rubber washers 40 and 41 offer a better character of resiliently opposed opposition to tilting of the axis of the spindle shank 4 than when the cross section areas of the washers 40 and 41 are a rectangle.

In adapting a particular construction to a bobbin or other load of different weight and different degrees of eccentricity, it is many time desirable to adjust the degree of resilient opposition which the washers 40 and 41 supply. This can be accomplished in either of two ways. First, by changing the washers themselves and employing a rubber of stiffer consistency or by using a different thickness of compression washer 42, the amount of preload on the washers 40 and 41 may be adjusted and a similar effect secured. Actually, many times a combination of these two expedients can be employed for a fine adjustment of the spindle to a particular load, that is, a rough adjustment may be secured by selection of washers of a particular rubber stiffness and then the final adjustment effected by careful selection of thickness of compression washer 42.

It will likewise be found desirable to adjust the resilient effect of the dampener element 8. This can be accomplished in a similar manner by the selection of rubber or other elastomers of different durometer characteristics, i. e. stiffness, or by increasing the size, number and shape of the openings 9. In addition to changing the effective area or size of the notches 9 or more accurately reducing the effective area of the dampener element in contact with its surrounding wall, a similar result can be achieved in part at least by tapering the projecting ribs of the dampener element as illustrated in the embodiment shown in Fig. 1. For heavier loads, of course, the projecting ribs would not be tapered and fewer notches might be employed.

For many types of use, that is, for most textile bobbins for instance, sufficient self-balancing effect may be secured by the use of dampener element 8. However, when a particular self-dampening spindle construction is to be required to accommodate a heavy bobbin or one which is very much out of balance, auxiliary devices may, of course, be used on the bobbin itself which have some effect in dampening out vibrations. While such devices are known and commonly used, they are never effective to completely dampen vibrations and it is for this reason that under all circumstances, it is essential to still use the self-dampening spindle of the present invention to effect complete dampening of vibrations through critical speed.

The particular manner in which the nozzle, for the purpose of projecting the power stream against the vanes 25, is mounted in the nozzle plate 11 is illustrated more fully in Fig. 6 wherein the nozzle opening 51 is formed in the tubular extension 52 of a spool-like member whose annular flanges 53 and 54 are provided with grooves in which are mounted O-rings 55 and 56. The body of the spool is drilled throughout its axial extent with a passage 57 at the bottom of which is formed the throat 58 of the nozzle.

The nozzle spool as thus constructed is provided with a plurality of openings 59 through the central portion of the spool so that the hydraulic driving fluid may be admitted into the passage 57 from the supply passage 21 regardless of position of the nozzle in the chamber. The nozzle is held in position by means of a screw plug 61 ahead of which is a compressible synthetic rubber element 62 for the purpose of resiliently maintaining the nozzle spool on its annular seat 63.

In Fig. 6a is shown an alternative form of construction of the nozzle and the means by which the same is positioned in the chamber.

The construction illustrated in Fig. 6a is generally similar to that illustrated in Fig. 6 so that like reference characters, by utilizing prime marks, have been employed to designate like parts. This construction differs from that illustrated in Fig. 6 largely in that the spool 59 is made in two parts separated by a spring 59' thus facilitating manufacture and making unnecessary the use of a compression member such as 62.

The construction illustrated in Fig. 7 differs from that illustrated in Fig. 1 in particular regard to the manner in which driving communication is established between the cup 30 and the spindle drive flange 34. In this construction driving communication is established between the cup and the flange 34 by virtue of friction between the rubber washers 40 and 41 and the flange 34 by virtue of such rubbers washers being bonded to the flange. The rubber washers are then in frictional engagement with the bottom of the cup 30 and the under face of the compression washer 42'. Relative rotation between the compression washer 42' and the flange 33 of the cup 30 is restrained by means of one or more radially extending pins 63. Instead of using such pins, many obvious modifications may be employed, as for example, keyed washers, T's and the like. Alternatively, the inner periphery of the flange 33 of the cup might be provided with a plurality of circumferentially spaced axially extending serrations or ribs meshing with complementary ribs or serrations on the periphery of the compression washer 42. Instead of having the rubber washers 40 and 41 bonded to the flange 34, in spindles adapted for light work, such bonding may not be necessary since frictional contact between the parts will be sufficient to carry the load.

Alternatively, the rubber washers might be bonded to the cup 30 and the washer 42' instead of to the flange 34 as described.

The construction illustrated in Fig. 8 is a simplification of the means for supporting the dampener element at the lower end of the spindle. In the construction illustrated in Fig. 1 it will be noted that the spindle shank is rotatably supported within the dampener element by means of anti-friction bearings so that the dampener element or more particularly the rubber portion 8 thereof does not rotate. In the construction illustrated in Fig. 8, however, the lower end of the rotor shaft 27' is extended downwardly through the lower bearing 28 for a distance sufficient to overlie the dampener element. The spool 7' which supports the flexible dampener element 8' is accordingly mounted directly on the lower end of the spindle shank 4 and held in assembled relation thereon by means of a snap ring 64, or any other suitable means such as a nut with or without a key might be employed for this purpose. It is also within the contemplation of my invention to form the flexible dampening element 8 by molding them onto the periphery of a thin steel tube which, for example, might then be slipped onto the reduced end of the spindle shank 4 instead of employing the more bulky spool 7'.

The construction illustrated in Fig. 8 is ordinarily not as desirable for use on a high-speed spindle construction as illustrated in Fig. 1. This is for the reason that in the construction illustrated in Fig. 8 the rubber rotates whereas in Fig. 1 it does not. When rubber rotates under high speeds, the resilient effectiveness thereof varies with the speed as a result of centrifugal force imposed on the rubber, and this is ordinarily not desirable. However, for many types of work such as in the textile industry when utilizing low speed spindles or in the cotton textile field where speeds are ordinarily not as high as in the field of synthetic fibers, the construction illustrated in Fig. 8 will be entirely satisfactory.

The construction illustrated in Fig. 9 employs the same over-all general principles of my invention. In Fig. 9 the sleeve 65 is structurally the equivalent of the housing stem 10 of the construction illustrated in Fig. 1 and supports from the frame element 66, the lower bearing 67, and the dampener element generally indicated at 68, which may be constructed in accordance with any of the forms previously illustrated and described. The rotor shaft 69 in this case supported again by the upper bearing 70 has a cup 71 mounted thereon which has formed integral therewith as illustrated a whorl surface 72 adapted to receive the tape 73 by which spindles of this type are driven.

While the cup and its associated mechanism illustrated in Fig. 9 is like that previously illustrated in Fig. 7, actually I would ordinarily prefer to use a somewhat different construction more like that illustrated in Fig. 1 whereby some means is provided in conjunction with the periphery of the spindle-drive flange 74 and the cup 71 for the purpose of establishing direct driving communication therebetween. As will be apparent, however, any of the various modified forms of the driving connection may be employed with any of the various modifications illustrated herein.

Fig. 10 illustrates a modification of the structure illustrated in the previous figures in that the electric motor replaces the tape 73 of Fig. 9. In this instance the field structure 75 of the motor would be carried on the inner periphery of a housing 76 which, at its lower end, supports the lower bearing and dampener element. The shaft 77, corresponding to shaft 69 of Fig. 9 and shaft 27 of Fig. 1, would carry the armature of the electric motor. The entire assembly being clamped to a rail 78 for example by means of nuts 79 and 80.

The modification illustrated in Fig. 11 differs from the forms shown in the previous figures in the manner in which the spindle 100 is supported and driven. In this modification, the housing, fragments of which are shown at 101 and 102, carries spaced anti-friction bearings 103 and 104 which rotatably support the hollow shaft 105 to which the impeller 106 of the hydraulic motor is secured. The spindle 100 throughout the major portion of its axial extent has an outside diameter which is substantially less than the inside diameter of the shaft 105 and projects as at 107 and 108 from the opposite ends of the hollow shaft 105. Adjacent its upper end, the hollow shaft 105 contains a rubber bushing 109 which is of such normal size that in order to be assembled as shown inside of the hollow shaft 105 and around the spindle 100 is at least slightly pre-loaded. The bushing 109 is secured in place by means of snap rings 110 and 111.

The lower end of the shaft 105 carries a reenforcing annular insert 112 inwardly of the anti-friction bearing 104 for the purpose of reenforcing the end of the shaft. The splined end 108 passes through the opening in the annulus 112 with substantial radial clearance and has secured to the end thereof an annulus 113 whose outside diameter is slightly less than the inside diameter of the housing part 102 at this point, it being noted that the bore of the housing 102 in this area is cylindrical and is closed by a removable screw cap 114. The screw cap 114 is provided with a concave inner surface 115 which is a segment of a sphere, whose center lies on the longitudinal axis of the spindle 100 at about midway within the rubber bushing 109. A block 116 having a spherical face complementary to the face 115 and a flat upper face complementary to the flat lower face of the annulus 113 supports the latter as it oscillates radially with respect to the spindle 100.

Other modes of applying the principle of the invention may be employed, change being made as regards the details described, provided the features stated in any of the following claims or the equivalent of such be employed.

I, therefore, particularly point out and distinctly claim as my invention:

1. A spindle driving device comprising in combination: a housing; a hollow shaft in said housing; means for rotatably supporting said shaft in said housing; means for driving said shaft; a spindle arranged substantially concentrically in said shaft, having throughout the major portion of its axial extent an outside diameter substantially less than the inside diameter of said shaft and at its first end extending from said shaft; a cup on the end of said shaft from which projects said first end of said spindle, a radial flange on said spindle in said cup, elastomeric annuli in said cup coaxial therewith and on opposite sides axially of said flange, means for axially compacting said annuli flange and cup, circumferentially spaced complementary apertures in the outer periphery of said flange and the inner periphery of the wall of said cup and balls mounted in such complementary openings locking said flange and cup against relative rotation; and means mounted on the second end of said spindle limiting and, when said spindle is running, opposing the radial displacement of such second end of the spindle and consequently also limiting and opposing the aforesaid angular displacement between the axes of said shaft and spindle.

2. A spindle driving device comprising in combination: a housing; a hollow shaft in said housing; means for rotatably supporting said shaft in said housing; means for driving said shaft; a spindle arranged substantially concentrically in said shaft, having throughout the major portion of its axial extent an outside diameter substantially less than the inside diameter of said shaft and at one end extending from said shaft; coupling means forming a driving connection between said shaft and spindle which is substantially non-yielding in the direction of transmission of torque from the former to the latter but permits limited relative angular displacement of the axes of the shaft and spindle; resiliently deformable means inserted between said spindle and shaft where said spindle extends from said shaft to oppose such relative axial displacement of the spindle and shaft and being readily removable for replacement and substitution of other such means affording different degrees of such resilient opposition; and means mounted on the second end of said spindle limiting and resiliently opposing such displacement at such second end.

3. A spindle driving device comprising in combination: a housing; a hollow shaft in said housing; means for rotatably supporting said shaft in said housing; means for driving said shaft; a spindle arranged substantially concentrically in said shaft, having throughout the major portion of its axial extent an outside diameter substantially less than the inside diameter of said shaft and at one end extending from said shaft; coupling means forming a driving connection between said shaft and spindle which is substantially non-yielding in the direction of transmission of torque from the former to the latter but permits limited relative angular displacement of the axes of the shaft and spindle; resiliently deformable means inserted between said spindle and shaft where said spindle extends from said shaft to oppose such relative axial displacement of the spindle and shaft and being readily removable for replacement and substitution of other such means affording different degrees of such resilient opposition; and means in the space between said shaft and spindle at the second end of the spindle limiting and resiliently opposing such displacement at such second end.

4. A spindle driving device comprising in combination: a housing; a hollow shaft in said housing; means for rotatably supporting said shaft in said housing; means for driving said shaft; a spindle arranged substantially concentrically in said shaft, having throughout the major portion of its axial extent an outside diameter substantially less than the inside diameter of said shaft and at one end extending from said shaft; coupling means forming a driving connection between said shaft and spindle which is substantially non-yielding in the direction of transmission of torque from the former to the latter but permits limited relative angular displacement of the axes of the shaft and spindle; resiliently deformable means inserted between said spindle and shaft where said spindle extends from said shaft to oppose such relative axial displacement of the spindle and shaft and being readily removable for replacement and substitution of other such means affording different degrees of such resilient opposition; an anti-friction bearing mounted on the second end of the spindle; and means removably supported on said housing radially resiliently supporting said anti-friction bearing to limit and resiliently oppose such displacement of the second end of the spindle.

5. A device as set forth in claim 4 characterized further in that said last-named means supporting the anti-friction bearing comprises a replaceable elastomeric annulus having a circumferentially spaced series of ribs at its outer periphery.

References Cited in the file of this patent

UNITED STATES PATENTS

| | | |
|---|---|---|
| 1,483,903 | Masury | Feb. 19, 1924 |
| 2,304,595 | Prentice | Dec. 8, 1942 |
| 2,561,830 | Vanderzee | July 2, 1951 |
| 2,571,267 | Ljunggren | Oct. 16, 1951 |